United States Patent
Lee

(10) Patent No.: US 9,325,887 B2
(45) Date of Patent: Apr. 26, 2016

(54) PORTABLE TERMINAL AND METHOD FOR DETECTING POSTURE OF THE SAME

(75) Inventor: Junghyun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/236,047

(22) PCT Filed: Aug. 8, 2012

(86) PCT No.: PCT/KR2012/006311
§ 371 (c)(1),
(2), (4) Date: Jan. 29, 2014

(87) PCT Pub. No.: WO2013/022273
PCT Pub. Date: Feb. 14, 2013

(65) Prior Publication Data
US 2014/0139726 A1    May 22, 2014

(30) Foreign Application Priority Data

Aug. 9, 2011 (KR) .................. 10-2011-0079080
Jul. 18, 2012 (KR) .................. 10-2012-0078031

(51) Int. Cl.
*H04N 5/225*    (2006.01)
*G06F 1/16*    (2006.01)
*H04M 1/725*    (2006.01)

(52) U.S. Cl.
CPC ............ *H04N 5/2254* (2013.01); *G06F 1/1686* (2013.01); *H04M 1/72522* (2013.01); *H04N 5/2252* (2013.01); *G06F 2200/1637* (2013.01); *H04M 2250/52* (2013.01)

(58) Field of Classification Search
CPC ...................................... H04N 5/225
USPC ...................................... 348/207.99
See application file for complete search history.

(56) References Cited

U.S. PATENT DOCUMENTS

| | | | |
|---|---|---|---|
| 6,567,715 B1 * | 5/2003 | Sinclair et al. | 700/110 |
| 2007/0180909 A1 * | 8/2007 | Uchiyama et al. | 73/504.14 |
| 2008/0031609 A1 | 2/2008 | Rukes | |
| 2009/0027510 A1 | 1/2009 | Yumiki | |
| 2009/0138736 A1 * | 5/2009 | Chin | 713/320 |
| 2010/0062804 A1 | 3/2010 | Yonemochi | |
| 2010/0105429 A1 | 4/2010 | Koitabashi | |
| 2011/0169509 A1 * | 7/2011 | Alini et al. | 324/686 |
| 2014/0028887 A1 * | 1/2014 | Azuma | 348/333.01 |
| 2014/0028897 A1 * | 1/2014 | Azuma | 348/357 |

FOREIGN PATENT DOCUMENTS

| | | | |
|---|---|---|---|
| EP | 1731995 A2 | 12/2006 | |
| EP | 1801542 A2 | 6/2007 | |

* cited by examiner

*Primary Examiner* — Anthony J Daniels
(74) *Attorney, Agent, or Firm* — Birch, Stewart, Kolasch & Birch, LLP

(57) ABSTRACT

Disclosed is a portable terminal and method for detecting posture of the portable terminal, the portable terminal including a lens of a camera capturing an object, an actuator moving the lens for focus adjustment, a electrostatic capacity measuring unit measuring an electrostatic capacity of the actuator, and a controller for detecting a posture of the camera in response to the electrostatic capacity measured by the electrostatic capacity measuring unit.

9 Claims, 4 Drawing Sheets

PORTABLE TERMINAL AND METHOD FOR DETECTING POSTURE OF THE SAME

TECHNICAL FIELD

The teachings in accordance with exemplary embodiments of this invention relate generally to a portable terminal and a method for detecting posture of the portable terminal.

BACKGROUND ART

Concomitant with generalization of wide propagation of various portable terminals and commercialization of wireless Internet services, demands by consumers related to the portable terminals are diversified, and as a result, various types of attachments are mounted on the portable terminals.

A camera module may be the representative attachment capable of capturing an object in a still image or a moving image, and storing the picture in an image data and editing and transmitting, as occasions demand.

Meanwhile, a focus of a camera changes in response to a distance between a lens and an object. Thus, in order to capture an excellent quality of picture, AF (Automatic Focus) function is required for automatically adjusting a focus in response to changes in distance from the object.

DISCLOSURE OF INVENTION

Technical Problem

Accordingly, the present invention has been made keeping in mind with the above requirements or problems occurring in the prior art, and the present invention provides a portable terminal configured to detect posture of the portable terminal without embedding a position sensor or a gravity sensor to allow obtaining much more inner layout freedom of the portable terminal and reducing a manufacturing cost, and a method for detecting posture of the portable terminal.

Technical problems to be solved by the present invention are not restricted to the above-mentioned statement, and any other technical problems not mentioned so far will be clearly appreciated from the following description by skilled in the art.

Solution to Problem

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a portable terminal, the portable terminal comprising: a lens of a camera capturing an object; an actuator moving the lens for focus adjustment; a electrostatic capacity measuring unit measuring an electrostatic capacity of the actuator; and a controller for detecting a posture of the camera in response to the electrostatic capacity measured by the electrostatic capacity measuring unit.

In some exemplary embodiments, the actuator is a micro actuator.

In some exemplary embodiments, the actuator is a portable terminal using an electrostatic force.

In some exemplary embodiments, the controller detects the posture of the camera using a change time of the electrostatic capacity measured by the electrostatic capacity measuring unit.

In some exemplary embodiments, the portable terminal further comprises an actuator driving unit repeatedly vibrating the actuator.

In some exemplary embodiments, the portable terminal further comprises storage stored with posture data of the camera corresponding to the changed time of the electrostatic capacity.

In some exemplary embodiments, the controller controls a power driving unit using the detected posture data of the camera.

In some exemplary embodiments, the controller turns on or off each component of the portable terminal using the detected posture data of the camera.

In another general aspect of the present invention, there is provided a method for detecting a posture of a portable terminal, the method comprising: initially driving an actuator; receiving electrostatic capacity in response to the initial driving of the actuator as a feedback; repeatedly driving the actuator to receive the electrostatic capacity as a feedback; comparing an electrostatic capacity value received as a feedback by the initial driving of the actuator with an electrostatic capacity value received as a feedback by the repeated driving of the actuator.

In some exemplary embodiments, the comparing step includes determining whether a displacement is higher than a threshold.

In some exemplary embodiments, the comparing step includes recognizing that a posture change of the portable terminal has occurred, in case the displacement is higher than the threshold.

In some exemplary embodiments, the step of initially driving the actuator includes detecting posture of the portable terminal performed by the portable terminal, in case a signal tone is generated.

In some exemplary embodiments, the actuator is actuated, in a case the signal tone is generated before the initial driving of the actuator in the step of initially driving the actuator.

In some exemplary embodiments, the method includes ending operation of the actuator after it is recognized that the posture change of the portable terminal has occurred.

In some exemplary embodiments, the method may include changing to signal tone release mode or vibration mode after the operation of the actuator is ended.

Advantageous Effects of Invention

A portable terminal and method for detecting posture of the portable terminal according to an exemplary embodiment of the present invention has an advantageous effect in that posture of the portable terminal can be detected free from a position sensor or a gravity sensor to enable obtainment of an inner layout freedom of the portable terminal much more and reduction of manufacturing cost.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

Figure 1:
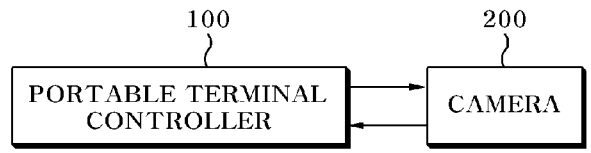
FIG. 1 is a schematic block diagram illustrating a configuration of a portable terminal according to an exemplary embodiment of the present invention.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-9 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thereafter," "then," "next," "therefore", etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present. As may be used herein, the terms "substantially" and "approximately" provide an industry-accepted tolerance for its corresponding term and/or relativity between items.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present invention may be applicable to various types of portable terminals. Examples of such terminals may include mobile terminals as well as stationary terminals, such as mobile phones, user equipment, smart phones, notebook computers, DTV, computers, digital broadcast terminals, PDAs (personal digital assistants), portable multimedia players (PMP) and/or navigators.

The portable terminals of the present invention may include all types of portable terminals including folder types, bar types, swing types and slider types of portable terminals.

Now, the portable terminal and method for detecting posture of the portable terminal according to exemplary embodiments of the present invention will be described in detail with reference to the accompanying drawings.

FIG. 1 is a schematic block diagram illustrating a configuration of a portable terminal according to an exemplary embodiment of the present invention.

Referring to FIG. 1, a portable terminal according to an exemplary embodiment of the present invention includes a camera (200) capturing an object and measuring an electrostatic capacity generated by a micro actuator for focus adjustment, and a controller (100) detecting posture of the portable terminal in response to a changed time of the electrostatic capacity measured by the camera (200).

Thus, the camera (200) in the portable terminal according to an exemplary embodiment of the present invention captures measures the electrostatic capacity generated by the micro actuator, and the controller (100) detects the posture of the portable terminal in response to a changed time of the electrostatic capacity measured by the camera (200).

Thus, the portable terminal according to an exemplary embodiment of the present invention is advantageous in that posture of the portable terminal can be detected free from a position sensor or a gravity sensor to enable further obtainment of an inner layout freedom of the portable terminal as much as size of a sensor and reduction of manufacturing cost.

Meanwhile, a conventional portable terminal must be equipped with a position sensor or a gravity sensor to have a posture detecting function, whereby the portable terminal can perform a variety of functions in postures detected by the position sensor or the gravity sensor. The sensor may be a gyro sensor.

Particularly, in capturing an object by a camera mounted on the portable terminal, the detected posture information of the portable terminal is recorded on the captured photograph, and when reproducing the photograph, the photograph is automatically rotated 90°, 180° or 270° based on the stored posture information to display the object in an erect posture.

Figure 2:
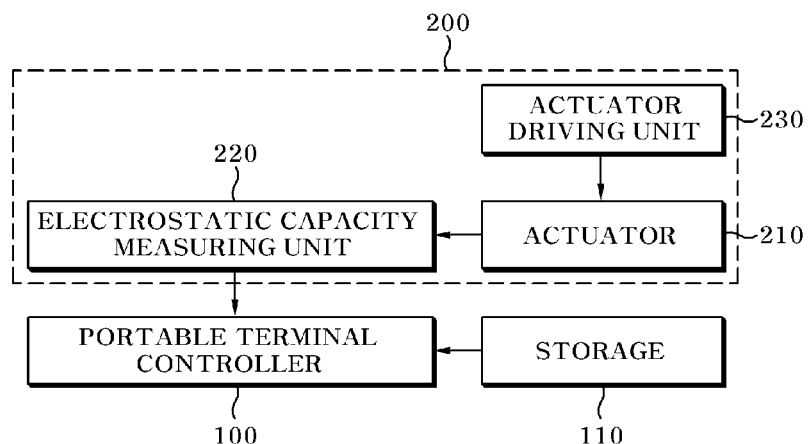
FIG. 2 is a schematic block diagram illustrating a configuration of a portable terminal according to an exemplary embodiment of the present invention.
Figure 5:
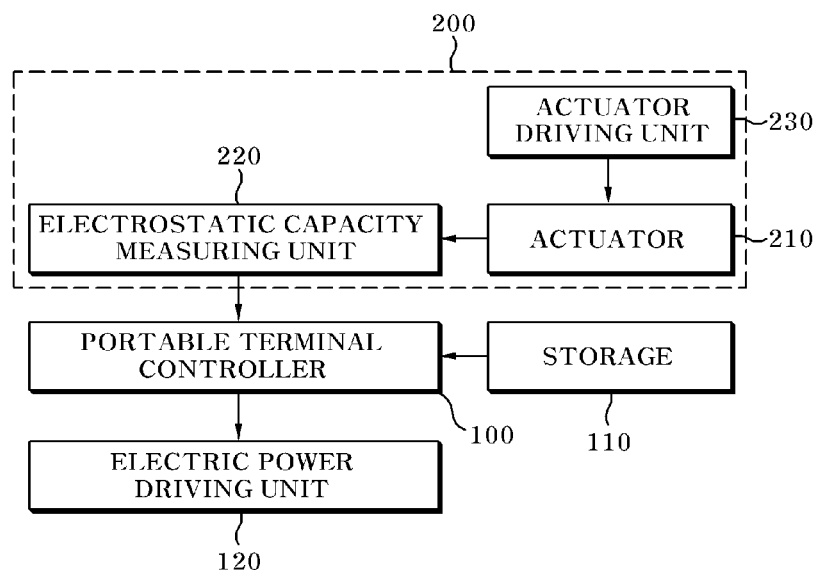
FIG. 5 is a schematic block diagram illustrating another configuration of a portable terminal according to an exemplary embodiment of the present invention.

FIG. 2 is a schematic block diagram illustrating a configuration of a portable terminal according to an exemplary embodiment of the present invention, and FIG. 5 is a schematic block diagram illustrating another configuration of a portable terminal according to an exemplary embodiment of the present invention.

Referring to FIG. 2, a portable terminal according to an exemplary embodiment of the present invention may include the camera (200) formed with an actuator (210) provided in a micro actuator for moving a lens using electrostatic force for focus adjustment, an electrostatic capacity measuring unit (220) for measuring electrostatic capacity generated by the actuator (210), and an actuator driving unit (230) repeatedly vibrating and driving the actuator (210), and a portable terminal controller (100) detecting posture of the portable terminal in response to a changed time of the electrostatic capacity measured by the electrostatic capacity measuring unit (220), where the actuator driving unit (230) may be defined by a driving unit controlling a voltage for driving the actuator (210), where the voltage is adjusted to control movement of the lens.

The actuator (210) may be provided in a variety of shapes, and may be a micro actuator, for example. In this case, the actuator (210) generates the electrostatic capacity when vertically moving the lens using the electrostatic force, where the electrostatic capacity generated by the actuator (210) is measured by the electrostatic capacity measuring unit (220).

At this time, the electrostatic capacity measuring unit (220) may receive the electrostatic capacity in real time as a feedback when the actuator (210) moves the lens. Furthermore, the actuator (210) may be so designed as to linearly move using the electrostatic force, where a repeated vibrating drive may be defined by a reciprocating motion. That is, the lens may be moved by the linear movement of the actuator (210) to perform the focus adjustment.

Thus, the portable terminal controller (100) detects the posture of the portable terminal in response to a changed time of the electrostatic capacity measured by the electrostatic capacity measuring unit (220), and a control signal is outputted for performing a specific function using the detected posture of the portable terminal.

Furthermore, the portable terminal according to an exemplary embodiment of the present invention may further include a storage (110) stored with posture data of the portable terminal corresponding to the changed time of the electrostatic capacity, and the portable terminal controller (100) may receive data of the changed time of the electrostatic capacity measured by the electrostatic capacity measuring unit (220), read out the data of the portable terminal corresponding to data of the changed time of the electrostatic capacity from the storage and detect the posture of the portable terminal.

As illustrated in FIG. 5, the portable terminal controller (100) may control a power driving unit (120) using the detected posture data of the portable terminal. That is, in a case face-down posture of the portable terminal is maintained for a predetermined period of time, which is recognized as the portable terminal in a state of not being used by a user, the portable terminal controller (100) may output a control signal to the power driving unit (120) to allow the portable terminal to perform only a minimum function, whereby unnecessary battery consumption can be prevented.

The portable terminal controller (100) can turn on or turn off each component of the portable terminal using the detected posture data of the portable terminal, where the portable terminal includes a display, a camera and other components. At the same time, the portable terminal controller (100) can optimize an autofocus range using the detected posture data of the portable terminal.

Figure 3A:
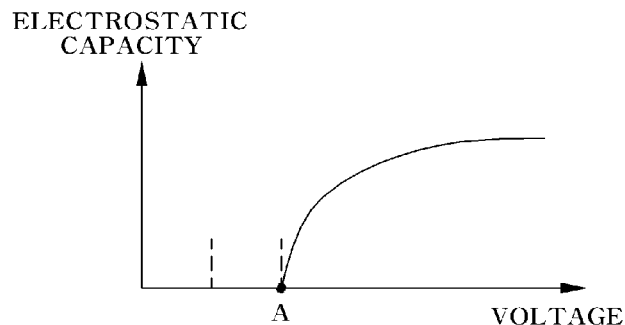
FIGS. 3a and 3b are graphs explaining a method for detecting posture of a camera using changed time of electrostatic capacity in the camera according to an exemplary embodiment of the present invention.
Figure 3B:
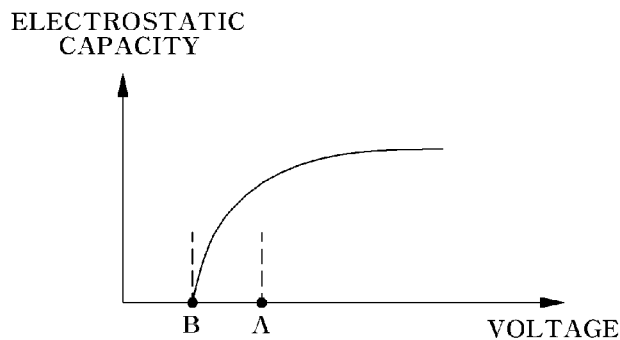
Figure 4A:
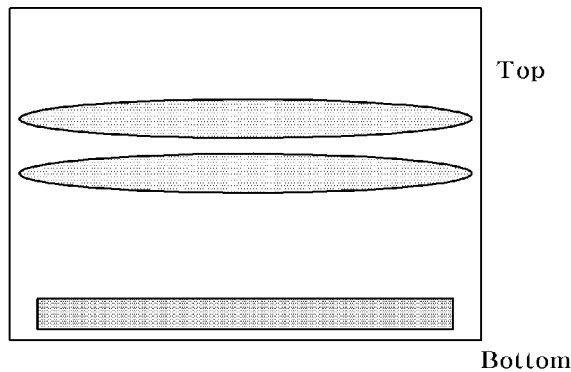
FIGS. 4a and 4b are mimetic diagrams explaining posture of a camera according to an exemplary embodiment of the present invention.
Figure 4B:
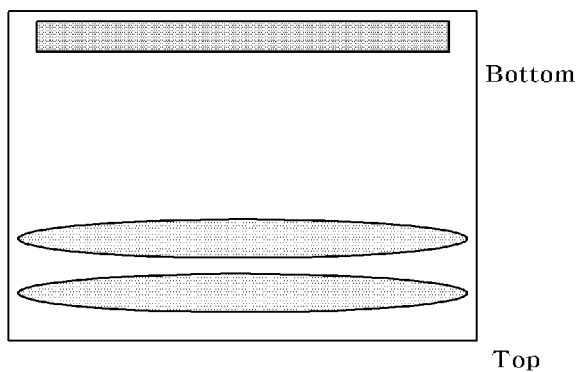

FIGS. 3a and 3b are graphs explaining a method for detecting posture of a camera using changed time of electrostatic capacity in a portable terminal according to an exemplary embodiment of the present invention, and FIGS. 4a and 4b are mimetic diagrams explaining posture of a camera according to an exemplary embodiment of the present invention.

As noted above, a minimum changed time of the electrostatic capacity may vary depending on posture of the camera mounted on the portable terminal.

That is, as shown in FIG. 4a, an initial changed time of electrostatic capacity in "bottom up view" of FIG. 4a corresponds to 'A' of FIG. 3a, and as shown in FIG. 4b, an initial changed time of electrostatic capacity in "top down view" of FIG. 4b corresponds to 'B' of FIG. 3b. Thus, detection of a changed time between 'A' and 'B' of electrostatic capacity can detect the posture of the portable terminal as depicted in FIG. 3b.

Figure 6A:
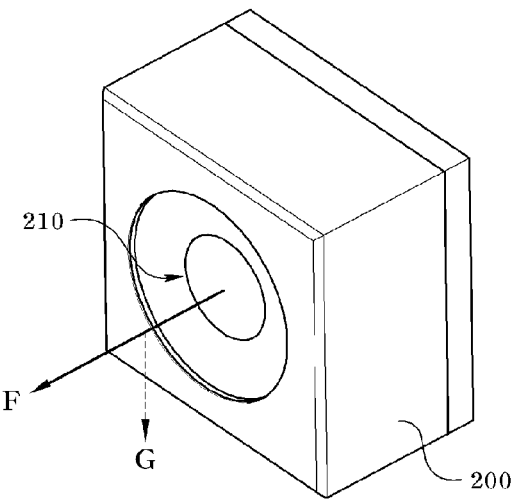
FIGS. 6a, 6b and 6c are schematic views illustrating position status of a camera based on posture of the camera according to an exemplary embodiment of the present invention.
Figure 6B:
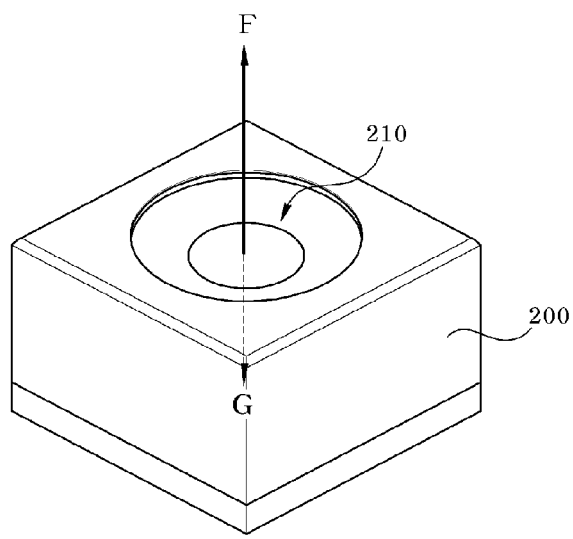
Figure 6C:
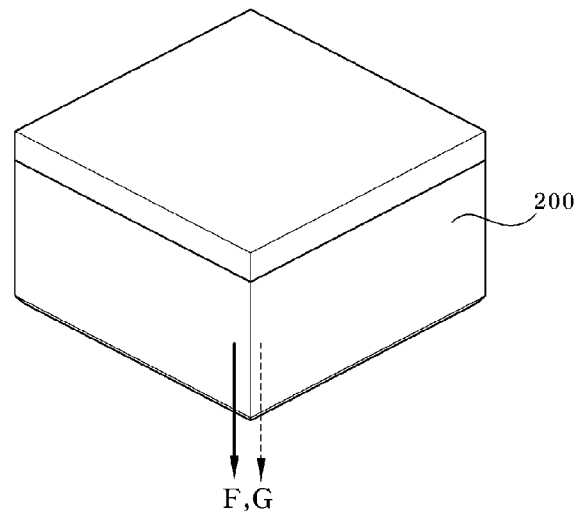
Figure 7:
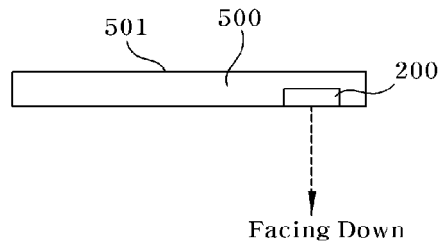
FIG. 7 is a conceptual diagram illustrating a posture of a camera according to an embodiment of the present invention.
Figure 8:
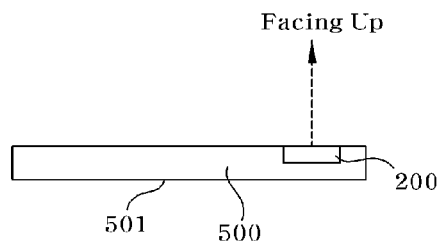
FIG. 8 is a conceptual diagram illustrating a posture of a camera according to another embodiment of the present invention.

FIG. 5 is a schematic block diagram illustrating another configuration of a portable terminal according to an exemplary embodiment of the present invention, FIGS. 6a, 6b and 6c are schematic views illustrating position status of a camera based on posture of the camera according to an exemplary embodiment of the present invention, FIG. 7 is a conceptual diagram illustrating a posture of a camera according to an embodiment of the present invention, and FIG. 8 is a conceptual diagram illustrating a posture of a camera according to another embodiment of the present invention.

In a case the portable terminal is in a perpendicularly erected posture (i.e., a posture laid in 'G' of gravitational direction, hereinafter referred to as 'facing horizontal' posture), the actuator (210) generates a force (F) moving the lens to a direction perpendicular to the gravitational (G) direction as shown in FIG. 6a.

Furthermore, in a case the portable terminal is in a horizontal posture and the actuator (210) takes a posture of being positioned at an upward direction of the portable terminal (hereinafter referred to as 'facing up' posture), the actuator (210) generates a force (F) moving the lens to a direction opposite to the gravitational (G) direction, as illustrated in FIG. b.

Furthermore, in a case the portable terminal takes a horizontal posture, and the actuator (210) takes a posture of being positioned at a downward direction of the portable terminal (hereinafter referred to as 'facing down' posture), the actuator (210) (see FIGS. 6a and 6b) generates a force (F) moving the lens to a same direction as the gravitational (G) direction, as shown in FIG. 6c. Therefore, the force (F) moving the lens of the actuator (210) becomes a resultant force or a component force relative to the gravitation force (F), depending on the posture of the portable terminal.

A physical moving distance of the lens caused by the actuator (210) in postures of FIGS. 6b and 6c generates sag (bending or hanging downward phenomenon).

For reference, a difference of electrostatic capacity resultant from generation of sag phenomenon is approximately 10 pF in a camera mounted with the actuator, and in consideration of a case where a direction of the camera position is radically changed from 'facing down' posture to 'facing up' posture, the difference of electrostatic capacity may be a minimum 20 pF, which therefore may be utilized as a principle for determining a quantitative opinion relative to determination of position.

Meanwhile, the aforementioned 'facing down' posture is where the portable terminal (500) takes a horizontal posture, and an upper surface (501) of the portable terminal (500) faces up, and the camera (200) of the portable terminal (500) is positioned at a downward direction, as shown in FIG. 7, and the aforementioned 'facing up' posture is where the portable terminal (500) takes a horizontal posture, and an upper surface (501) of the portable terminal (500) faces down, and the camera (200) of the portable terminal (500) is positioned at an upward direction, as shown in FIG. 8.

MODE FOR THE INVENTION

Figure 9:
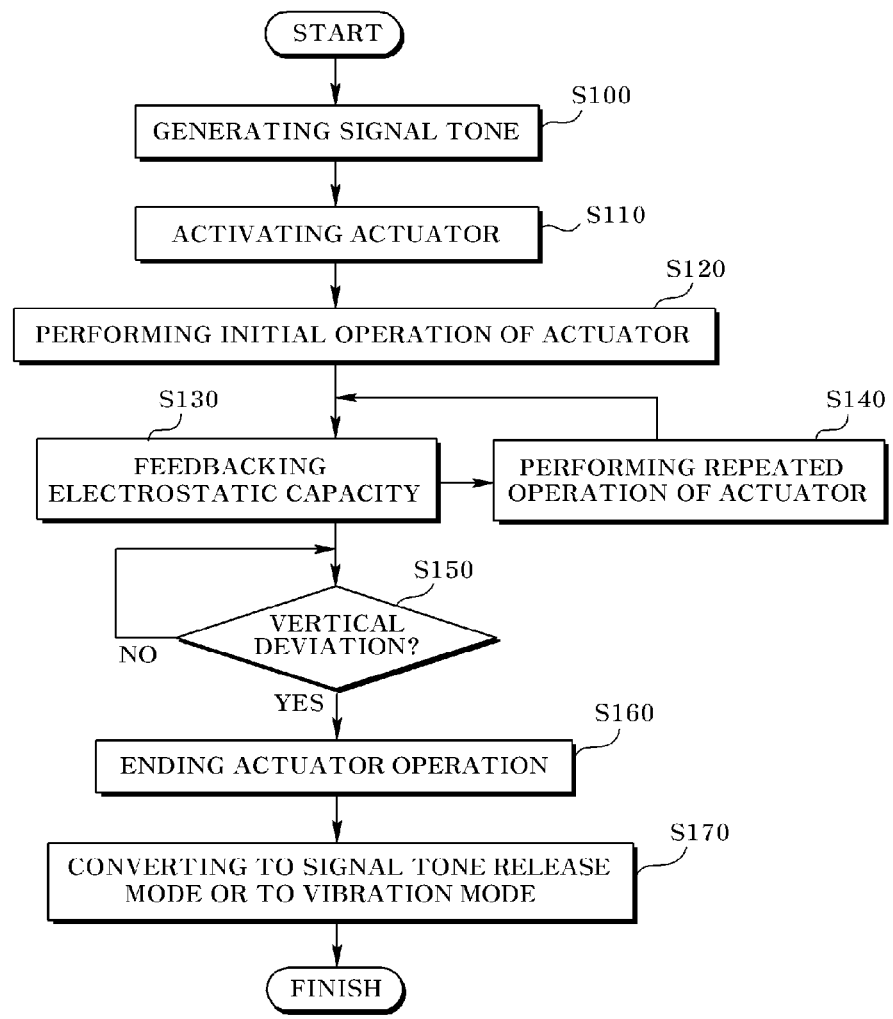
FIG. 9 is a flowchart illustrating a method for detecting posture of a portable terminal according to an exemplary embodiment of the present invention.

FIG. 9 is a flowchart illustrating a method for detecting posture of a portable terminal posture according to an exemplary embodiment of the present invention.

A method for detecting posture of a portable terminal is, in a case a signal tone is generated as in S100, to first activate the actuator (S110), where the meaning of 'activating the actuator' is, not to supply a power necessary for a pickup device, but to supply a power necessary for driving an IC driver so that the actuator can be separately driven.

That is, the principle of activating the actuator is to separately supply a power to the actuator without driving a sensor, whereby consumption current necessary for activating the camera can be maximally saved. At this time, the consumption power for driving the actuator is approximately 0.1 mW, which is almost nothing as a consumption power.

Furthermore, in order to remove a load necessary for activating the actuator, there is no burden to power consumption in case a power is applied to the actuator IC driving unit while a power is being supplied to the portable terminal itself, and in case this principle is utilized, the step of 'S110' may be omitted. That is, in case a signal tone is generated in S100, the actuator is initially driven in 'S120'.

At this time, the reason of initially driving the actuator is to learn current posture of perpendicular direction ('facing down' posture or 'facing up' posture) of the portable terminal. Generally, a time necessary for fully driving the actuator is approximately 10~20 ms, which is ten times faster than VCM (Voice Coil Motor), such that an operation time can be shortened to within several micro seconds, in a case a driving range is restricted to a predetermined range.

Subsequent to S120, an electrostatic capacity based on the actuator is received as a feedback (S130), where feedback of electrostatic capacity is performed by the electrostatic capacity measuring unit, and the received electrostatic capacity is stored per code unit.

After the performance of S130, the actuator is repeatedly driven as shown in S140, and the electrostatic capacity is received at S130, where the repeated driving of the actuator is to learn posture changes in the portable terminal.

In a case an initial electrostatic capacity value is stored at S130, the actuator is repeatedly driven again to receive the electrostatic capacity in real time.

Successively, after the performance of S130, determination is made as to whether there is a posture change in the portable terminal to a perpendicular direction (S150), where the step of S150 is to determine whether there is a predetermined displacement between an electrostatic capacity value received as feedback by the initial driving of the actuator at S120 and an electrostatic capacity value received as feedback by the repeated driving of the actuator at S140.

If it is determined at S150 that there is a posture change in the portable terminal to a perpendicular direction, that is, if it is determined that a displacement between an electrostatic capacity value received as feedback by the initial driving of the actuator and an electrostatic capacity value received as feedback by the repeated driving of the actuator is higher than a threshold, the portable terminal is recognized to have generated a posture change. For example, it is recognized that the portable terminal has rotated 180°.

Thereafter, the operation of actuator is ended (S160). Successively, the step of changing to signal tone release mode or vibration mode may be performed (S170).

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The portable terminal and method for detecting posture of same according to an exemplary embodiment of the present invention has an industrial applicability in that posture of the portable terminal can be detected free from a position sensor or a gravity sensor to allow further obtaining an inner layout freedom of the portable terminal as much as the size of the sensor and reducing a manufacturing cost.

The invention claimed is:
1. A portable terminal comprising:
a lens of a camera for capturing an object;
an actuator moving the lens for focus adjustment;
an actuator driving unit controlling a voltage for driving the actuator;
an electrostatic capacity measuring unit measuring an electrostatic capacity of the actuator;
a storage stored with posture data of the portable terminal corresponding to the electrostatic capacity of the actuator; and
a controller receiving the electrostatic capacity measured by the electrostatic capacity measuring unit,
wherein the electrostatic capacity measuring unit measures a first electrostatic capacity received by an initial driving of the actuator and the controller detects a posture of the portable terminal by reading out the posture data of the portable terminal corresponding to the first electrostatic capacity from the storage, when a signal tone of the portable terminal is generated.

2. The portable terminal of claim 1, wherein the actuator is a micro actuator.

3. The portable terminal of claim 1, wherein the actuator uses an electrostatic force.

4. The portable terminal of claim 1, wherein the actuator driving unit repeatedly vibrates the actuator.

5. The portable terminal of claim 1, wherein the controller controls a power driving unit using the detected posture data of the camera.

6. The portable terminal of claim 1, wherein the controller turns on or off each component of the portable terminal using the detected posture data of the camera.

7. A method for detecting a posture of a portable terminal, the method comprising:
   controlling a voltage to initially drive an actuator for moving a lens for focus adjustment;
   receiving an electrostatic capacity in response to an initial driving of the actuator as a feedback;
   repeatedly controlling a voltage to drive the actuator to receive the electrostatic capacity as a feedback; and
   comparing a first electrostatic capacity received by the initial driving of the actuator with a second electrostatic capacity received by a repeated driving of the actuator,
   wherein the step of controlling the voltage to initially drive the actuator includes detecting a posture of the portable terminal by reading out posture data of the portable terminal corresponding to the first electrostatic capacity from a storage, when a signal tone is generated, and
   wherein the comparing step comprises:
      determining whether a displacement between the first electrostatic capacity and a second electrostatic capacity is higher than a threshold, and
      recognizing that a posture change of the portable terminal has occurred, in case the displacement is higher than the threshold.

8. The method of claim 7, further comprising ending operation of the actuator after it is recognized that the posture change of the portable terminal has occurred.

9. The method of claim 8, further comprising changing to signal tone release mode or vibration mode after the operation of the actuator is ended.

* * * * *